US008949023B2

(12) United States Patent  
Lin

(10) Patent No.: US 8,949,023 B2  
(45) Date of Patent: Feb. 3, 2015

(54) TRANSMISSION OF WIRELESS MESSAGES OF CURRENT VEHICLE LOCATION AND ESTIMATED ARRIVAL TIME TO REQUESTORS

(71) Applicant: Bo-In Lin, Los Altos Hills, CA (US)

(72) Inventor: Bo-In Lin, Los Altos Hills, CA (US)

(73) Assignee: Bo-In Lin, Los Altos Hills, CA (US)

( * ) Notice: Subject to any disclaimer, the term of this patent is extended or adjusted under 35 U.S.C. 154(b) by 51 days.

(21) Appl. No.: 13/726,111

(22) Filed: Dec. 22, 2012

(65) Prior Publication Data  
US 2014/0180575 A1 Jun. 26, 2014

Related U.S. Application Data

(62) Division of application No. 11/650,639, filed on Jan. 6, 2007, now Pat. No. 8,340,904.

(60) Provisional application No. 60/757,560, filed on Jan. 8, 2006.

(51) Int. Cl.  
G01C 21/00 (2006.01)  
G08G 1/123 (2006.01)  
H04W 4/12 (2009.01)  
H04W 4/04 (2009.01)

(52) U.S. Cl.  
CPC .................. *G08G 1/123* (2013.01); *H04W 4/12* (2013.01); *H04W 4/04* (2013.01)  
USPC ............................ 701/465; 701/423; 340/994

(58) Field of Classification Search  
CPC ....... G08G 1/123; G08G 1/116; G01C 21/00; G01C 21/26; G06F 19/00; H04W 4/04; H04W 4/12  
USPC ..................... 701/414, 423, 465, 511, 2, 117; 340/994, 988, 539.13  
See application file for complete search history.

(56) References Cited

U.S. PATENT DOCUMENTS

| 7,482,952 | B2 * | 1/2009 | Horstemeyer | 340/994 |
| 7,610,146 | B2 * | 10/2009 | Breed | 701/514 |
| 8,340,904 | B2 * | 12/2012 | Lin | 701/465 |
| 2007/0197231 | A1 * | 8/2007 | Lin | 455/456.1 |

* cited by examiner

Primary Examiner — Gertrude Arthur Jeanglaude  
(74) Attorney, Agent, or Firm — Bo-In Lin

(57) ABSTRACT

A wireless communication device disposed on a moving vehicle. The wireless communication device further includes a geographic location determination processor for determining a geographic location on a city map. The wireless communication device further receives a vehicle location and arrival schedule request for sending a message to a passenger waiting for the vehicle for providing the geographic location on the city map and an estimated arrival time of the vehicle to a passenger waiting for the vehicle.

13 Claims, 2 Drawing Sheets

TRANSMISSION OF WIRELESS MESSAGES OF CURRENT VEHICLE LOCATION AND ESTIMATED ARRIVAL TIME TO REQUESTORS

This application is a Divisional Application and claims priority of a pending application Ser. No. 11/650,639 filed by the Applicant of this application on Jan. 6, 2007. application Ser. No. 11/650,639 is a Formal Application and claims priority of a Provisional Application entitled "TRANSMISSION OF WIRELESS MESSAGES OF CURRENT VEHICLE LOCATION AND ESTIMATED ARRIVAL TIME TO REQUESTORS" filed on Jan. 7, 2006 and accorded Ser. No. 60/757,560 by the same Applicant of this Application, the benefit of the filing dates are hereby claimed under Title 35 of the United States Code. The disclosures of Application No. 60/757,560 and Ser. No. 11/650,639 are hereby incorporated by reference.

BACKGROUND OF THE INVENTION

1. Field of the Invention

This invention relates generally to a signal transmission system implemented with wireless signal transmitters and receivers. More particularly, this invention is related to a signal transmission system for transmitting wireless messages, e.g., a short message (SM), to requesters to provide most current vehicle location and estimated arrival time to a designated location.

2. Description of the Prior Art

A passenger waiting at a bus stop for a bus traveling on fixed route in a city still suffers from the inconvenience that the passenger has no information about where the bus is and when the bus is estimated to arrive at the bus stop. Actually, modern technologies have already developed wireless signal transmissions and data handling capabilities to provide information about the location of a moving vehicle. There are also "navigators" commercially available to estimate the arrival time of a bus to a particular location. However, a passenger still relies on a bus schedule posted on a bus stop. The posted bus schedule provides a rough schedule of when the next bus is coming. However, in reality the arrival time of next bus is often unpredictable. Passengers often have to wait a long period of time for the coming bus without any knowledge about the delay that is caused by the unexpected traffic conditions, engine breakdown or any other unknown reasons. Tremendous wastes of time and resources occur due to such lack of communications.

Similar kinds of wastes often occurs in a metropolitan areas where taxi drivers are circling around city blocks trying to pickup a riders while a person may walk anxiously on a different street looking for a vacant cab and not able to find one. Even though short messages are commonly used on a personal or organizational levels to communicate a wide varieties of data and information, current wireless communication systems still have not provided an effective solution to resolve such difficulties and wastes.

The location of an incoming bus and an estimated arrival time to a designated bus top can be conveniently transmitted as a short message to a passenger using a cellular phone. Short messages have been broadly employed to transmit different kinds of information and data. For example, in Patent Application 20020084888, a system for sending and receiving personal information using a mobile terminal is disclosed. In that patent application, personal information is sent using a short message service with attached identification information. Accordingly, when a receiving mobile terminal receives the short message, the attached identification information allows the receiving mobile terminal to distinguish and process the short message for personal information differently from other general short messages.

In another Patent Application 20050020287, a location-based reference information transmitted through a wireless communication system is disclosed that provides a '411xx' value added service to wireless users. The disclosed 411xx' service allows a mobile user who may be unfamiliar with their current geographic location to obtain quick, accurate, and current information relating to the geographic area, e.g., different services in their current location, stores, libraries, gas stations, etc., via a mobile terminated (MT) short message system (SMS) message. In addition to the traditional '4-1-1' dialed digits, a mobile user would also dial a number (or numbers) representing a feature code for a particular service, e.g., nearby ATMs, or traffic information. Upon receiving a 411xx call, the message service center (MSC) generates an ORREQ/TCAP trigger based on a translation of the requested service represented by the extra 'xx' digits.

In U.S. Pat. No. 6,738,634, Shin discloses a communication system and a method for performing short message services in the communication system. The communication system includes a radio link control (RLC) layer for dividing a data unit having a first length corresponding to short messages transmitted from a higher layer on a down link into data units having second lengths, and for reconstructing data units having third lengths transmitted from a lower layer on an up link into data units having fourth lengths; and a media access control (MAC) layer for multiplexing logical channels assigned for the data units having the second lengths on the down link with different logical channels, performing scheduling for the data units having the second lengths to obtain schedule messages, and demultiplexing transmission channels multiplexed from the lower layer on the up link.

In another Patent Application 20040196866, a method for transmitting and recording schedule using a short message service is disclosed. This method is provided for transmitting a common schedule message to a plurality of mobile terminals using a short message service (SMS) in a mobile terminal having an SMS function and a schedule function, and enabling a mobile terminal receiving the schedule message to record the received schedule message therein as a schedule. If a user selects a schedule transmission for transmitting a schedule registered in the mobile terminal to another mobile terminal, the mobile terminal converts a data format for the schedule into a data format of a schedule-recordable SMS message, and then transmits the schedule-recordable SMS message. To record a schedule, the mobile terminal receiving a schedule message converts a data format of the received SMS message into a format of schedule-recordable data and records the converted data therein as a schedule, if schedule recording is selected by the user.

Other than the applications of short messages (SM) to transmit textual messages, transmission of other types of signal messages including audio or video signals have not bee applied to transmit vehicle location or schedule information.

In another Patent Application 20060164259, a wireless mobile vehicle real-time tracking and notification systems are disclosed. The system features a system and methods for notifying passengers of an approaching vehicle. Utilizing such a system and methods, passengers can remain in a safe, controlled environment, avoiding harsh environmental conditions and excessive waiting times, instead arriving at their pick-up point closer and prior to a vehicle's arrival. More specifically, the patent application relates to a bus notification system wherein passengers are able to know the location and estimated arrival time of the bus several minutes before its arrival at a specified location along the bus route. The patent application also features a system and methods for locating an in-transit vehicle and for providing real-time mapping and monitoring of such in-transit vehicles. The disclosures made in Application 20060164259 are hereby incorporated by reference in this Patent Application. The disclosures made in Application 20060164259 however are often limited by the inaccurate prediction of the time of arrival due to the uncertainty of traffic conditions on the street. Additionally, a mobile phone user is not yet provided with a convent method to receive the notification. The estimated time of arrival (ETA) as that may be posted on houses or bus dispatch time may not be convenient for a mobile phone user.

For these reasons, the above Patent Applications and Patents do not provide effective solution to resolve the difficulties currently encountered by the passengers, especially for passengers using a mobile phone for communications. Therefore an urgent need still exists to implement a signal transmission/reception and processing configuration to make the location and schedule information of a bus or a moving vehicle available to the passengers such that better time management and scheduling can be achieved.

SUMMARY OF THE PRESENT INVENTION

It is therefore an aspect of the present invention to provide system configurations and signal process methods to enable a passenger waiting for a bus, a taxi, or any person waiting for an incoming vehicle to request and obtain a location and an accurate estimate time of arrival of the expected incoming vehicles taking into considerations of the dynamic changing traffic conditions. Unnecessary wastes of time can be eliminated and better time management can be achieved.

Another aspect of the present invention is to provide to a requester of a transportation service using a wireless communication device, e.g., a cellular phone, the location and estimated arrival time of a taxi or a vehicle for hire and related information about that vehicle. Therefore, both the taxi driver and the user of a wireless communication device are provided with information to better manage their time and schedule to minimize unnecessary wastes of time and resource.

Briefly, in a preferred embodiment, the present invention discloses a wireless communication device disposed on a moving vehicle. The wireless communication device further includes a geographic location determination processor for determining a geographic location on a city map. The wireless communication device further receives a vehicle location and arrival schedule request for sending a message to a passenger waiting for the vehicle for providing the geographic location on the city map and an estimated arrival time of the vehicle to a passenger waiting for the vehicle.

In summary a method to inform a location of a bus traveling on a predefined bus route making a plurality of bus stops is disclosed in this invention. The method includes a step of installing a device on the bus for sending a message to a user of a mobile communication device to indicate a current location of the bus. The step of sending the message further includes a step of sending the message with a bus stop name currently the bus is near in traveling on the predefined bus route. In another preferred embodiment, the method further includes a step of receiving a request from the user of the mobile communication device to receive the message for indicating a current location of the bus. In another preferred embodiment, the method further includes a step of paying a fee by the user of the mobile communication device for receiving the message. In another preferred embodiment, the method further includes a step of paying a fee by the user of the mobile communication device from an account associated with the communication device for receiving the message. In another preferred embodiment, the method further includes a step of using the device on the bus for detecting the current location of the bus. In another preferred embodiment, the method further includes a step of detecting the current location of the bus and estimating an arrival time to a requested location included in the request. In another preferred embodiment, the step of sending the message including a step of sending a short message (SM) to the mobile communication device. In another preferred embodiment, the step of sending the message including a step of sending an electronic mail (e-Mail) to the mobile communication device. In another preferred embodiment, the step of sending the message including a step of sending a voice message to the mobile communication device. In another preferred embodiment, the step of sending the message including a step of sending an image signal to the mobile communication device for showing the current location of the bus on a map. In another preferred embodiment, the step of installing the device on the bus further comprising a step of installing a global position system (GPS) on the bus for detecting a geographic location of the bus. In another preferred embodiment, the step of installing the device further comprising a step of installing an access point (AP) for communicating through a switch to a wireless local area network (WLAN) server for automatically detecting a wireless communication device followed by retrieving a user profile data record of the wireless communication device for establish a wireless communication with the wireless communication device.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
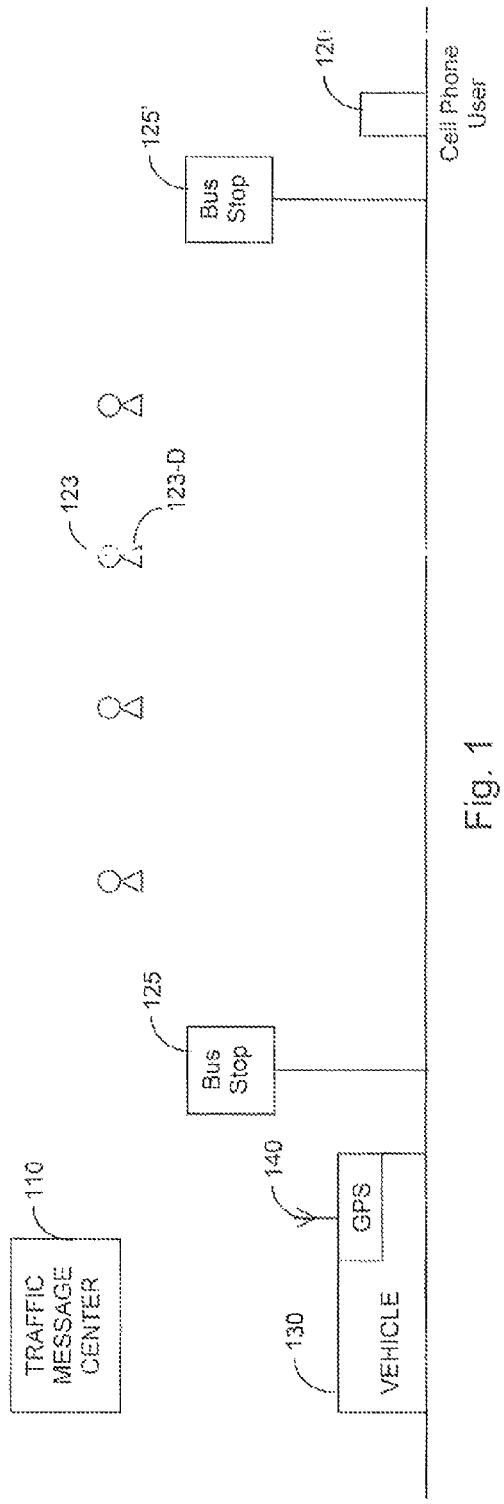
FIG. 1 is a functional block diagram of a wireless communication system of this invention.

FIG. 1 is a system functional diagram showing a wireless vehicle schedule communication system 100 that includes a traffic message center 110 for receiving a request from a cellular phone user 120. The request may be in the form of short message or any other type of requesting signals. The traffic message center 110 further receives a vehicle location signal from a vehicle 130. The vehicle location signal may be generated by different systems applying different technologies as will be further discussed below. In an embodiment shown in FIG. 1, the vehicle is equipped with a global position system (GPS) with a GPS signal transmitter 140. The GPS 140 with a GPS transmitter 140 can periodically transmit a geographic location signal to the traffic message center 110. The traffic message center 110 applies the signal received from the GPS transmitter 140 to process a schedule signal. The schedule signal may include the name of the current bus stop 125 closest to the current location of the vehicle according to the GPS signal received from the vehicle. The schedule signal may also include the estimated time of arrival of the bus to each of the bus stops, e.g., bus stop 125' where the user 120 is waiting for the bus, on the bus route. FIG. 1 also show there are many traffic lights 123 along the way from bus stop 125 to bus stop 125'. Each of these traffic lights 123 includes a traffic-monitoring device 123-D that can be a video camera or traffic speed detectors or combination of the devices to determine the traffic flow and speed. Each of these traffic monitor devices 123-D is further provided with a wireless transmitter to transmit a traffic flow and speed signal to the traffic message center 110 for dynamically estimate the time of arrival based on the real time measurements of traffic flow and speed conditions. Once the traffic message center 110 receives a vehicle schedule request from a cellular phone user 120, a schedule message is sent to the requestor's cellular phone 120 as a short message or other type of message signals, e.g., a voice message ready for the cellular phone user to retrieve from a phone message center. The traffic message center further has a schedule request charge processor 150 to charge a fee for responding to a request for providing the vehicle location and schedule. The charge for providing such service may be a special phone number that collect charge for each incoming call with certain rates. The charge may be collected as part of the phone bill that can either directed deducted from a deposited account of that cellular phone or a monthly bill sent to the cellular phone user.

Figure 2:
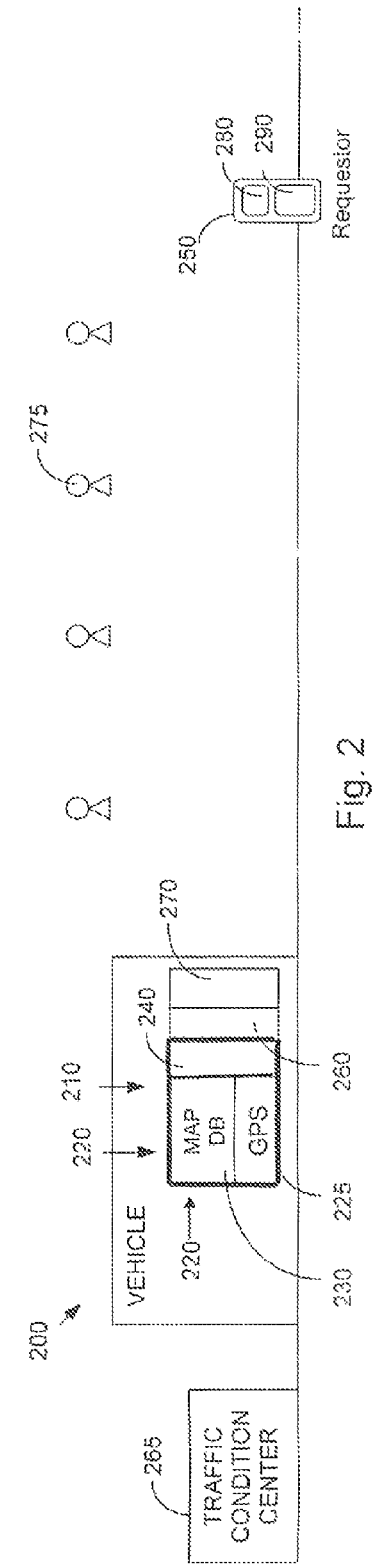
FIG. 2 is functional block diagram of a location and schedule device disposed on a vehicle for transmitting signals to the requesters to provide information about location and schedule of the vehicle.

FIG. 2 shows an alternate preferred embodiment of a location and schedule device 210 disposed on a vehicle 200. The location and schedule device 210 includes a vehicle location determination subsystem 220 that includes a global position system (GPS) device 225 for determining a geographic location of the vehicle 200. The location determination subsystem 220 also includes a map database 230 to process the geographic location signals received from the GPS 225 together with the map database 230 to determine the location of the vehicle on the map. The location and schedule processor 210 further includes a schedule estimator 240 to estimate a time of arrival to a requested location of a schedule and location requestor 250 using the map database and an average traveling speed of the vehicle 200 and the data of the real-time traffic condition as further described below. As an option the location and schedule process further receives data of real-traffic conditions. These data can be available from satellites 255 or from a traffic condition information center 265, or from traffic monitoring devices 275 located at different street corner or on the traffic lights. The data from the satellites 255, the traffic condition information center 265, or the traffic monitoring devices 275 provide traffic flow and traffic speed on a real time basis. Therefore, that the location and schedule device 210 can provide a more accurate and realistic estimate of arrival time. The location and schedule device 210 further includes a location and schedule request processor 260 to receive and process an incoming request from the location and schedule requestor 250. The location and schedule requestor 250 can send a request for vehicle location and schedule as a short message from a wireless communication device, e.g. a cellular phone. The wireless communication device may be a personal digital assistant (PDA) connected through a network, e.g., connection through the Internet. The vehicle location and schedule device 210 further includes a request response subsystem 270 for responding to the request in sending a location and schedule message to the requestor. The location and schedule message can be a short message to a cellular phone, an e-mail message to a PDA, a voice message to a voice message center. The location and schedule message in response to a request may be a multimedia signal including a map and showing the location of the vehicle and direction of traveling of the vehicle in coming to the location of the requestor.

FIG. 2 also shows that a requestor 250 is using a device with a video camera 280 as that often provided in the cellular phone now. A more convenient and faster way for the requester 250 using this cellular phone to apply the video camera as a scanner to scan a particular bar code for activating a schedule request of a particular bus according to the data embedded in the bar code. Alternately, an RFID chip may be available for sending a RF signal to the cellular phone and RF signal when received by the cellular phone can trigger a request to send to the location and schedule device on the bus 200 for the location and schedule device disposed on the bus 200 to send a location and estimate time of arrival either to the mobile device as a short message of other kinds of notification. Alternately, the mobile communication device used by the requester may have a particular sets of keys for the cellular phone to send a request signal to the location and schedule device 210 on the bus 200 or to a traffic schedule message center as that shown in FIG. 1 for the cellular phone to receive a message about the location and/or the estimate time of arrival to a particular location according to the request from the mobile device user included in the requesting message.

In an embodiment, when a passenger is riding on a taxi, the location and schedule device 210 can provide to a friend of a family member of the passenger an access code to periodically receive a signal. The signal will inform the friend or the family member of the passenger the location and schedule of arrival of the taxi to a designated location.

Figure 3:
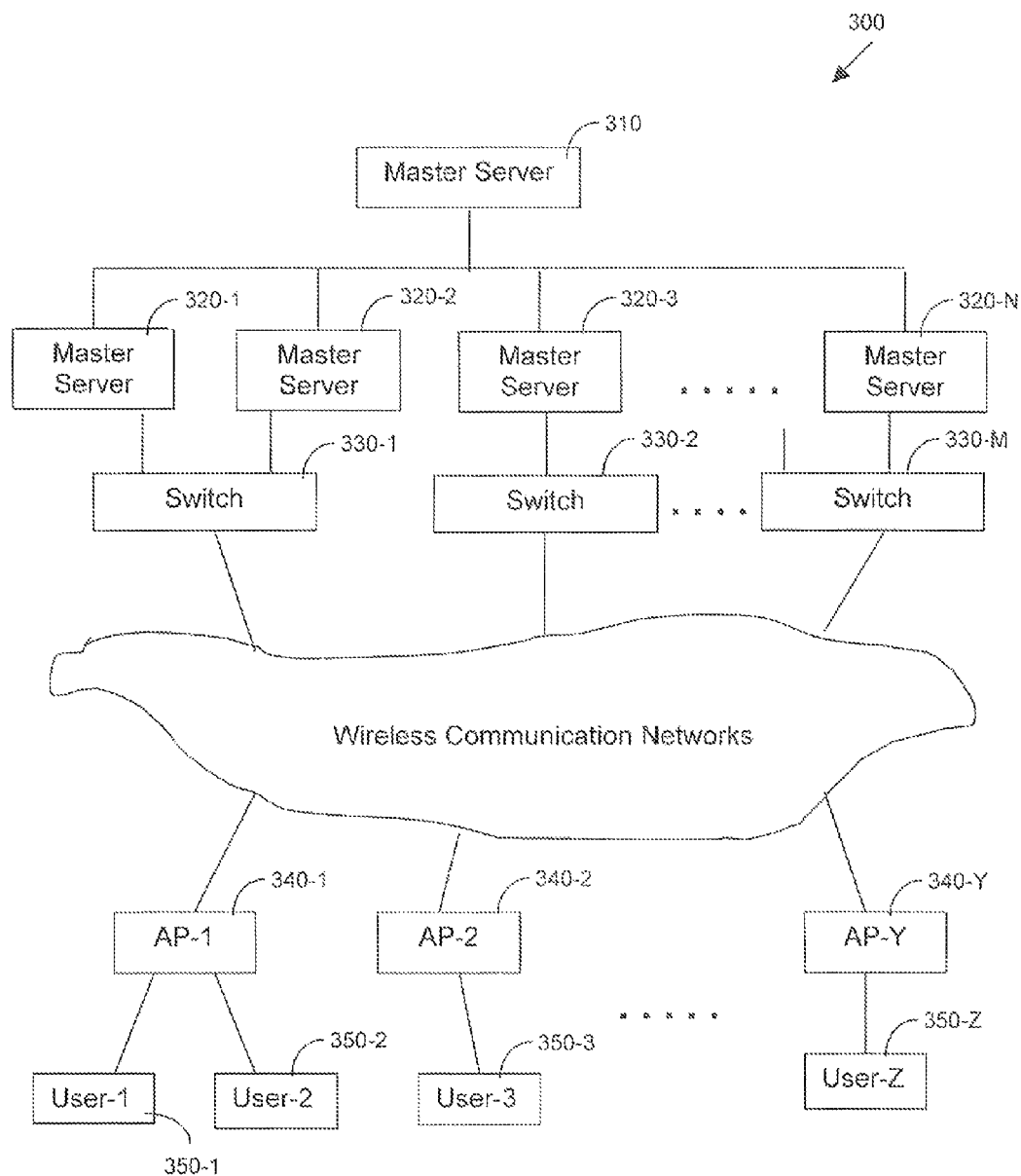
FIG. 3 is functional block diagram of a distributed wireless local area network (WLAN) communication systems with access point disposed on vehicles to detect and communicate with WLAN users.

Referring to FIG. 3 for a functional block diagram to illustrate a system configuration of a distributed wireless network (WLAN) 300. The WLAN system 300 includes a master server 310 connected through wired or wireless connection to a plurality of WLAN servers 320-1, 320-3, 320-3, . . . 320-N. Each of these WLAN servers is connected to a switch 330-1, 330-2, 330-3, . . . , 330-M. Through these switches, each of the WLAN servers 320-1, 320-2, 320-3, . . . , 320-N are in actively communication with a plurality of access points (APs), e.g., access points 340-1, 340-2, 340-3, . . . , 340-Y where Y can be any integer numbers. Each of these access points APs 340-1 to 340-Y is disposed on a vehicle for wirelessly connecting to a plurality of user of a wireless communication device 350-1, 350-2, 350-3, . . . 350-Z, where Z can be any integer number. This distributed WLAN system 300 is managed by distributing a user profile data record for flexibly managing the wireless communication through the APs. Once the wireless device user is detected by one of the access points 340-1 to 340-Y now disposed on a vehicle, the user profile data record is downloaded and a wireless communication is established between the user the AP with appropriate access privileges, and service requirements for the user. The vehicle now serves the function of access point further includes a GPS and map database for communicating the location and estimated arrival time to a user requested location through the WLAN communication. The access point 340-1 to 340-Y now disposed on the moving vehicles can also provide contents related to a local area when a wireless WLAN user is detected. Such contents may be store and shop names, special sales or other activities taking place near the location where a moving vehicle is passing through.

According to above descriptions and drawings, this invention describes a wireless communication device, e.g., location and schedule device 210, disposed on a vehicle 200. The wireless communication device 210 further includes a user interface 260 for receiving a user request with a user-designated location. The communication device 210 further includes a processor 240 for receiving data of geographic location and data of real-time traffic condition for determining a geographic location of the vehicle and an estimate time of arrival of the vehicle to the user designated location. In an exemplary embodiment, the user interface 260 and 270 further sends a wireless signal including the estimate time of arrival of the vehicle to the user designated location. In an exemplary embodiment, the user interface 260-270 further sends a short message (SM) to a mobile communication device 250 including the estimate time of arrival of the vehicle to the user designated location. In an exemplary embodiment, the user interface further sends an electronic mail (e-mail) to a communication device, such as a PDA, a computer or other types of network communication devices, including the estimate time of arrival of the vehicle to the user designated location. In an exemplary embodiment, the user interface further sends an audio message to a communication device 250 including the estimate time of arrival of the vehicle to the user designated location. In an exemplary embodiment, the user interface further sends a wireless signal including the geographic location of the vehicle and the estimate time of arrival of the vehicle to the user designated location. In an exemplary embodiment, the user interface further receives and processes the user request sent as a short message (SM) from a cellular phone 250 or different kinds of communication devices. In an exemplary embodiment, the user interface further receives and processes the user request sent as an electronic mail (e-mail). In an exemplary embodiment, the user interface further receives and processes the user request as an audio message. In an exemplary embodiment, the user interface further receives the user request as an audio message and the user interface 260 further includes a voice recognition processor for processing the audio message. In an exemplary embodiment, the processor further receives and processes data of global position system (GPS) as a data of geographic location. In an exemplary embodiment, the processor further receives and processes data from satellite 255 as the data of real-time traffic condition. In an exemplary embodiment, the processor further receives and processes data from a traffic control center 265 as the data of real-time traffic condition. In an exemplary embodiment, the processor further receives and processes data from a traffic monitor system 275 with video cameras disposed on city streets as the data of real-time traffic condition.

This invention further includes a mobile communication device 250 that includes a memory for storing a user request message including a user designated location for responding to a single user operational action on the mobile communication device to send out a user request including the user designated location for requesting an estimate time of arrival of a requested vehicle 200 to the user designated location. The single user operation action may include an operation of a user pressing a button or buttons of the keypad 290 on the cellular phone 250.

This invention also discloses a mobile communication device 250 that includes an input port for receiving an electromagnetic (EM) signal, such as an RF signal from an RFID device or any other EM signal transmitters, for activating a transmission of a user request message including a user designated location for requesting a time of arrival of a requested vehicle 200. In a different embodiment, the communication device 250 is a cellular phone that includes a video camera 280 for scanning a bar code or different types of coded tag for activating a transmission of a user request message including a user deignated location for requesting a time of arrival of a requested vehicle 200.

condition data for the processor 210 to determine a geographic location of the vehicle and the estimate time of arrival to the user designated location. In a exemplary embodiment, the step of receiving the real-time traffic condition further comprising receiving the real-time traffic condition from a traffic control center 265. In a exemplary embodiment, the step of receiving the real-time traffic condition further comprising receiving the real-time traffic condition from a satellite 255. In exemplary embodiment, the step of receiving the user request further includes a step of receiving the user request as a short message (SM). In another exemplary embodiment, the step of receiving the user request further includes a step of receiving the user request as a audio request such as an incoming call or a special audio signal recognized by the processor 210 to respond to the request.

In summary, this invention discloses a wireless communication system that includes a signal transmitter for transmitting a message to a user of a wireless communication device to provide a location information of a bus. In a preferred embodiment, the message providing a bus stop name near the bus. In an alternate preferred embodiment, the system further includes a bus schedule control center for receiving a request with a fee from the user of the wireless communication device to send the message. In another preferred embodiment, the system further includes a bus location detector for detecting a location of the bus. In another preferred embodiment, the system further includes a control center for receiving a request with a fee from the user of the wireless communication device to send the message.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

The invention claimed is:

1. A method of operating a vehicle comprising:
   placing a wireless communication device on said vehicle wherein the communication device having a global position system (GPS) processor and a transmitter for receiving global position system (GPS) data for computing a geographic location of said vehicle; and
   the transmitter further receiving a real-time wireless telephonic signal including a vehicle location request message from a remote requestor carrying a portable communication device and automatically generates and transmits a real-time vehicle location message directly to the portable communication device of the remote requestor to indicate the geographic location of the vehicle at the time when the real-time wireless telephonic signal is received in response to the vehicle location request message sent by the remote requestor as the real-time wireless telephonic signal.

2. The method of claim 1 wherein:
   said step of transmitting the real-time vehicle location message further comprising a step of sending the real-time vehicle location message from the transmitter of the communication device on the vehicle as a short message (SM) to the portable communication device of the remote requestor.

3. The method of claim 1 wherein:
said step of transmitting the real-time vehicle location message further comprising a step of sending the real-time vehicle location message from the transmitter of the communication device on the vehicle as an electronic mail (e-Mail) message to the portable communication device of the remote requestor.

4. The method of claim 1 wherein:
said step of transmitting the real-time vehicle location message further comprising a step of sending the real-time vehicle location message from the transmitter of the communication device on the vehicle as an audio message to the portable communication device of the remote requestor.

5. The method of claim 1 wherein:
said step of transmitting the real-time vehicle location message further comprising a step of sending the real-time vehicle location message from the transmitter of the communication device on the vehicle as an electronic file to the portable communication device of the remote requestor.

6. The method of claim 1 wherein:
said step of receiving the real-time wireless telephonic signal further comprising a step of receiving through the transmitter of the communication device on the vehicle a short message (SM) including the vehicle location request message directly from the portable communication device of the remote requestor.

7. The method of claim 1 wherein:
said step of receiving the real-time wireless telephonic signal further comprising a step of receiving into the transmitter of the communication device on the vehicle an electronic mail (e-mail) including the vehicle location request message directly from the portable communication device of the remote requestor.

8. The method of claim 1 wherein:
said step of receiving the real-time wireless telephonic signal further comprising a step of receiving through the transmitter of the communication device on the vehicle an audio message including the vehicle location request message directly from the portable communication device of the remote requestor.

9. The method of claim 1 wherein:
said step of receiving the real-time wireless telephonic signal further comprising a step of receiving through the transmitter of the communication device on the vehicle the vehicle location request message with a requestor location data and a vehicle arrival time request directly from the portable communication device of the remote requestor.

10. The method of claim 1 wherein:
said step of receiving the real-time wireless telephonic signal further comprising a step of receiving through the transmitter of the communication device on the vehicle the vehicle location request message with a requestor location data and a vehicle arrival time request directly from a cellular phone of the remote requestor.

11. The method of claim 1 wherein:
said step of receiving the real-time wireless telephonic signal further comprising a step of receiving through the transmitter of the communication device on the vehicle the vehicle location request message with a requestor location data and a vehicle arrival time request directly from a personal digital assistant (PDA) of the remote requestor.

12. The method of claim 1 wherein:
said step of receiving the real-time wireless telephonic signal further comprising a step of receiving through the transmitter of the communication device on the vehicle the vehicle location request message directly from a traffic control center as the remote requestor.

13. The method of claim 1 wherein:
said step of receiving the real-time wireless telephonic signal further comprising a step of receiving through the transmitter of the communication device on the vehicle the vehicle location request message and also a real-time traffic condition data directly from a traffic control center as the remote requestor.

* * * * *